United States Patent [19]
Azzola

[11] 4,350,084
[45] Sep. 21, 1982

[54] EXTERNAL REAR-VIEW MIRROR FOR MOTOR VEHICLES COMBINED WITH AN AIR INLET OPENING TO THE PASSENGER COMPARTMENT

[75] Inventor: Roberto Azzola, Turin, Italy
[73] Assignee: Saiag S.p.A. Industria Articoli Gomma, Turin, Italy
[21] Appl. No.: 205,023
[22] Filed: Nov. 7, 1980
[51] Int. Cl.³ .................................................. B60H 1/24
[52] U.S. Cl. ........................................... 98/2; 350/307
[58] Field of Search ............... 98/2, 2.11, 2.17, 40 V, 98/87; 350/307

[56] References Cited
U.S. PATENT DOCUMENTS
2,764,078  9/1956  Tell ............................................ 98/2
2,787,206  4/1957  Dustman ................................. 98/2
3,859,899  1/1975  Mills ........................................ 98/2

FOREIGN PATENT DOCUMENTS
2704226  8/1978  Fed. Rep. of Germany ...... 350/307
742054   2/1933  France ........................................ 98/2
55-44054 3/1980  Japan .................................... 350/307

Primary Examiner—Albert J. Makay
Assistant Examiner—Harold Joyce
Attorney, Agent, or Firm—Sughrue, Mion, Zinn, Macpeak & Seas

[57] ABSTRACT

An external rear-view mirror for a motor vehicle comprises a fairing with a rearwardly directed opening in which a reflective plate is adjustably mounted. The fairing is provided with a lateral flange for fixing of the mirror to the vehicle. An elbow-shaped duct is formed in the fairing and serves to conduct air entering an inlet in the forwardly directed wall of the fairing, out through an aperture in the fixing flange. The outlet end of the duct is terminated by an outlet fitting which is intended to be mounted in an aperture in the lateral wall of the vehicle body. This fitting is provided with a shutter device for regulating the air flow through the duct into the vehicle.

8 Claims, 4 Drawing Figures

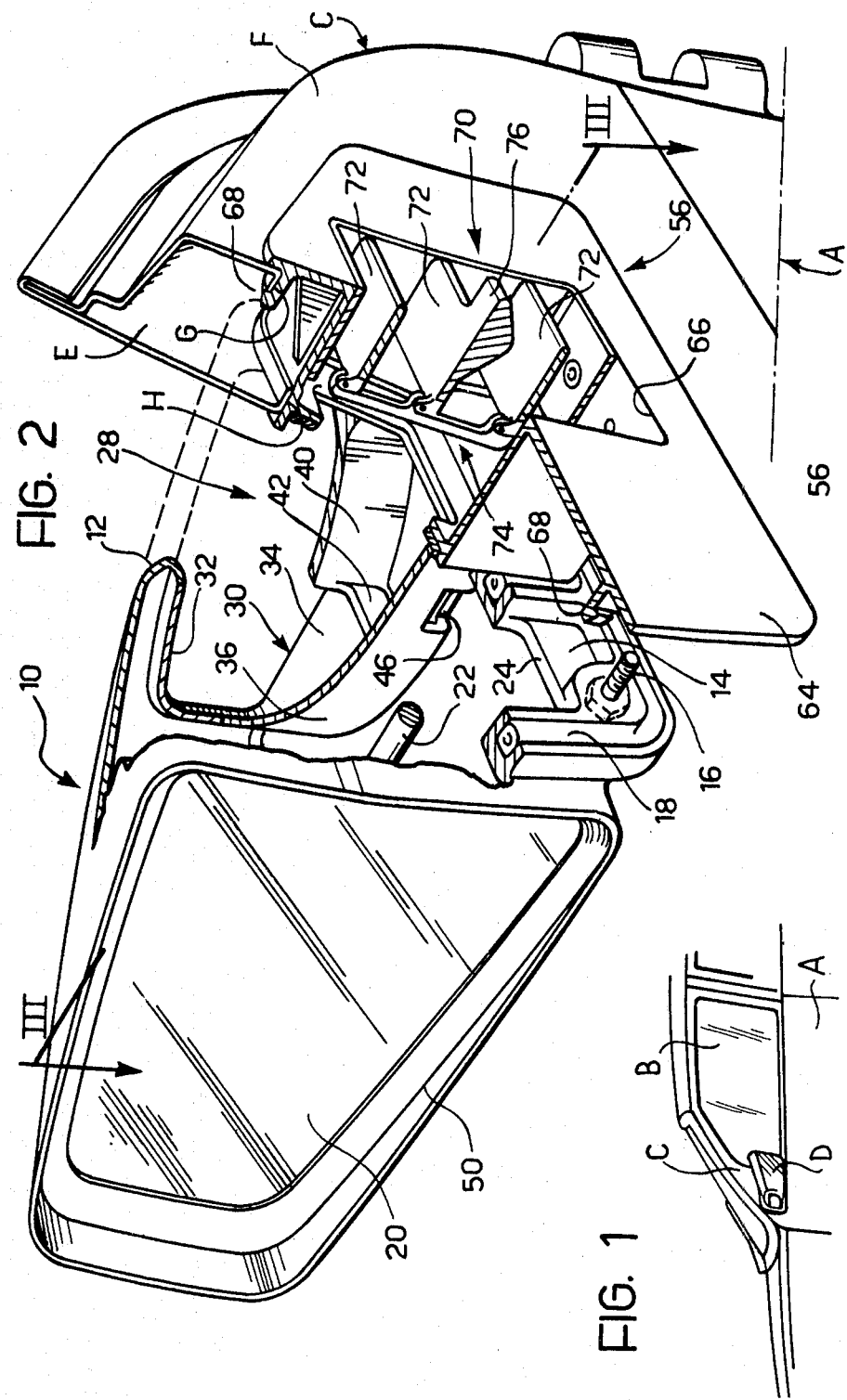

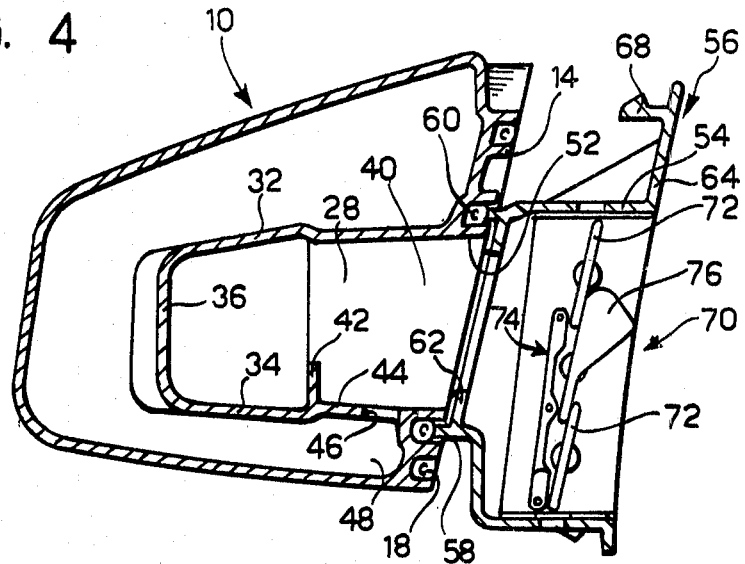
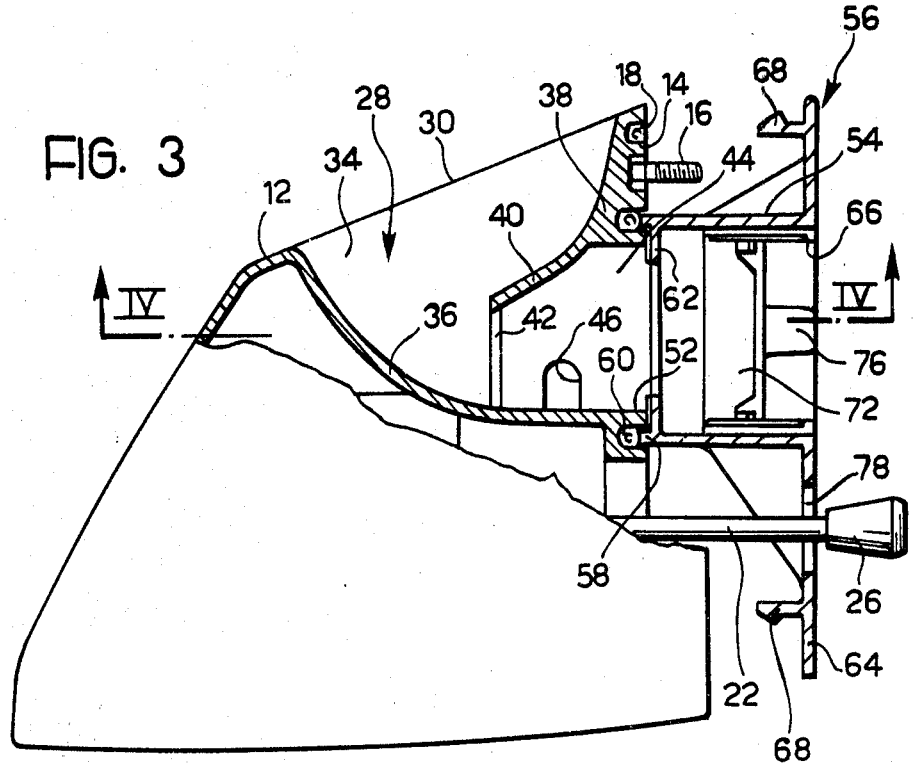

EXTERNAL REAR-VIEW MIRROR FOR MOTOR VEHICLES COMBINED WITH AN AIR INLET OPENING TO THE PASSENGER COMPARTMENT

The present invention relates to an external rear view mirror for vehicles, of the type comprising a fairing in the shape of a half-shell with a back wall intended to face forwardly and an open face intended to face rearwardly with respect to the direction of travel, and a reflective plate adjustably mounted in the open face of the fairing, said fairing being provided with a lateral wall constituting a flange for fixing to an external wall of a part of the vehicle body.

Rear-view mirrors of this type are mostly mounted on the front part of the doors of motor vehicles, on the driver's side. In many current vehicles the lower front part of the perimeter of the vehicle door window is delimited by an opaque portion which is more or less triangular. The presence of this triangular portion, apart from stylistic reasons, can largely be attributed to the fact that in many doors the front region is occupied by the hinge, so that there is no space in this region into which the window can be lowered.

Until a few years ago, on most motor cars, in the region of the said triangular section there was to be found a movable "quarter light" window or deflector. The tendency now is to do away with quarter lights mainly because of the ease they offered for breaking in. Many drivers, however, are unhappy with the lack of a quarter light which they were used to using for ventilating the passenger compartment.

The said triangular portion is at present exploited for the installation of the rear-view mirror, inasmuch as it is in the most convenient position for viewing from the driver's seat.

The object of the present invention is, above all, to make use of the space occupied by the said triangular portion, not only for the installation of the rear-view mirror, but also to provide an opening for ventilation, in the very area that drivers who are used to driving a vehicle with a quarter light would wish to have an inlet opening for ventilation.

It is understood, nevertheless, that a rear-view mirror according to the invention can be fitted in other positions, such as, for example, on the fixed part of the motor vehicle body immediately in front of the door.

According to the present invention, the said object is met by means of an external rear-view mirror for motor vehicles, of the type initially mentioned, characterised in that within the fairing there is formed or inserted a structure which defines an elbow-shaped duct having an inlet situated in the back wall of the fairing itself and acting as an intake for external air, the duct extending into the fixing flange and terminating in an outlet fitting intended to be mounted in an aperture of the body communicating with the passenger compartment, to act as a ventilation outlet, this outlet fitting being provided with a shutter device for restricting and possibly directing the flow of air.

The subject of the invention will be better understood by reading the following detailed description, with reference to the attached drawings, given purely by way of a non limitative example, and in which:

FIG. 1 is a fragmentary side view of a motor car equipped with a rear-view mirror according to the invention.

FIG. 2 is a cut-away perspective view, on a larger scale, of the mirror in its installed position.

FIG. 3 is a view from above of the mirror, partially sectioned on the horizontal plane indicated by the line III—III of FIG. 2, and FIG. 4 is a cross-section taken on the line IV—IV of FIG. 3.

In FIG. 1, the front door A of the driver's side of a vehicle includes a slidable window B which is delimited in the lower-front region by a wall portion C of a more or less triangular shape, which can be made of the same sheet metal as the door, or may consist of an inserted plate.

An external rear-view mirror D is installed on the portion C.

Referring to FIGS. 2 to 4, the external rear-view mirror comprises a fairing 10, of a moulded plastics material. The fairing 10 has the shape of a half-shell with a back wall 12 facing towards the front with respect to the direction of travel. The fairing 10 also includes a lateral wall 14 which constitutes a fixing flange. Embedded within the material of this flange are the heads of fixing screws 16, intended to be inserted in suitable holes in the sheet metal outer wall E of the portion C of the door A. A wide rectangular aperture G is formed in an inner wall F of this same portion C, one folded over edge of the aperture G being visible in FIG. 2. Through this aperture can be inserted the nuts intended to connect with the screws 16. Another similar aperture H is formed in the outer wall E and faces the aperture G.

The heads of the screws 16 are embedded in the flange 14 in such a way that they can be pulled out in the event of the mirror receiving a knock.

The flange or lateral wall 14 is provided with a peripheral sealing gasket 18, intended to cooperate with the sheet metal wall E.

The fairing 10 has an open face, facing backwards with respect to the direction of travel. Within this open face is disposed a reflective plate 20, properly called a mirror. The plate 20 is supported inside the fairing 10 by means of an articulated joint, for example, a ball or cardan joint, to allow adjustment of its orientation. The adjustment of its orientation can be effected by any means, for example, by an electrical system. However, by way of example, in the case under consideration the adjusting system comprises a rod 22 which passes through an aperture 24 of the flange 14 as well as the aperture H and G, and extends into the passenger compartment where it is provided with an operating knob 26.

In the fairing 10 there is disposed a structure which defines an elbow-shaped duct 28. This structure has been shown as being formed integrally with the fairing 10, but it could be constituted at least in part by inserted elements.

The elbow-shaped duct 28 has a mouth 30 situated in the back wall in such a way as to face forwardly with respect to the direction of travel and constitute an air inlet.

The structure which defines the duct 28 comprises an upper wall 32, a lower wall 34, and a radially outer wall 36. This latter curves gently from the mouth 28 until it meets the lateral wall or flange 14 at right angles thereto.

The duct 28 also comprises a radially inner wall part 38 substantially merged with a front part of the flange 14. From this wall part 38 there extends a first baffle plate 40 which extends in a substantially radial direction of the elbow and restricts the transverse section of the duct 28, in the vicinity of its mouth. The wall 38 and the baffle plate, 40, have near the mouth 30, a concave curved surface which confers a distinctly funnel shape to the mouth 30 and the initial part of the wall 36.

A second baffle plate 42 of small height extends upwardly from the lower wall 34, between the wall 36 and the end of the baffle 40.

The two baffles 40 constitute a labyrinth. In the event of rain, the barriers formed by the baffles serve to prevent the penetration into the passenger compartment, of drops of water entrained in the current of air entering through the air inlet 30.

A lower sump 44 is formed in the duct 29 downstream of the second baffle 42 for collecting water in the event of its being drawn past the labyrinth. The sump 44 has a drainage aperture 46 in its bottom which aperture communicates with an inner space 48 of the fairing. This latter communicates in its turn, with the outside by means of a slit 50 (FIG. 2) between the lower wall of the fairing 10 and a lower edge of the reflective sheet.

The duct 28 terminates, in the direction of the passenger compartment, in a substantially rectangular aperture 52 of the flange 14. Between the aperture 52 and the passenger compartment there extends a tubular body 54, with a substantially rectangular cross section, the main part of which constitutes an outlet fitting generally indicated 56. The tubular body 54 extends through the aperture G of the inner wall F, as well as through the corresponding aperture H (FIG. 2) of the outer wall E. At its end facing towards the flange 14 the body 54 has a peripheral axial flange 58 which sealingly engages a seal 60 housed within the flange 14. In this same region the body 54 has an inner radial flange 62, a lower part of which delimits the sump 44.

The fitting 56 also includes, integrally formed with the body 54, a plate part 64 applied as a facing against the inner wall F. The interior duct of the body 54 opens into the passenger compartment through a rectangular opening 66.

The plate 64 has resilient peripheral tabs 68 with a hook-shaped profile, which are snap-engaged with the edge of the aperture G of the inner sheet metal wall F. In this way, the whole fitting 56 is fixed in position and its plate 64 partly extends completely across the aperture G.

The fitting 56 is formed like a ventilation outlet provided with a shutter device for restricting and possibly directing the flow of air. There are in existence numerous devices of this kind and in this case, as an example, a convenient device has been shown, generally indicated 70. This device is of the louvre type and comprises horizontal slats 72 pivoted in the body 54 and interconnected by a linkage 74. A lever appendage 76 of one of the slats 72 allows these latter to be moved together between a position of complete closure of the outlet, shown in FIG. 4, and a position of complete opening, shown in FIG. 2.

In the case considered in which the reflective plate 20 is moved by means of the rod 22, the plate part or facing 64 has a slot 78 for the passage of the rod 22.

I claim:
1. An external rear-view mirror for a motor vehicle, said mirror comprising:
   a fairing in the shape of a half-shell defining an opening intended to face rearwardly with respect to the direction of travel, said half-shell including a back wall intended to face forwardly with respect to said direction of travel and a lateral wall constituting a fixing flange for fixing to an outer wall of the body of a vehicle,
   a reflective plate adjustably mounted in said opening of the fairing,
   a structure provided within said fairing and defining an elbow-shaped duct having an inlet situated in the said back wall which acts as an intake for external air, the duct extending into the said fixing flange, and -
   an outlet fitting terminating the duct at its end remote from its inlet, said fitting being intended to be mounted in a vehicle-body aperture communicating with the vehicle passenger compartment, to act as a ventilation outlet for air passing through the duct, said fitting being provided with a shutter device for controlling air flow through the duct.

2. A rear-view mirror according to the claim 1, wherein the duct-defining structure is formed to define an internal labyrinth of baffle plates within the duct, said baffle plates serving to restrict the transverse section of the duct and constituting barriers against the penetration of water droplets.

3. A rear-view mirror according to claim 2, wherein said baffle plates comprise a first baffle plate extending substantially radially of the elbow-bend of said duct from its radially inner part in the vicinity of the duct inlet, and a second baffle plate extending upwardly from a lower part of the duct between the end of the first baffle plate and the radially outer part of the duct itself.

4. A rear-view mirror according to claim 3 wherein the duct-defining structure is formed to provide a lower sump within the duct, said sump serving to collect water and being located downstream of the second baffle plate, the sump having a drainage aperture communicating with an internal space of the fairing which in its turn communicates with the outside by means of a slot defined between a lower wall of the fairing and a lower edge of the reflective plate.

5. A rear-view mirror according to claim 1, wherein an end part of the elbow-shaped duct, adjacent to the outlet fitting, is defined by an aperture of the flange.

6. A rear-view mirror according to claim 1, wherein the outlet fitting comprises a tubular body arranged to extend through the vehicle body, and a plate part applicable as a facing against the inside of the vehicle body.

7. A rear-view mirror according to claim 6, wherein the said plate part has resilient peripheral tabs with a hook shaped profile, intended to be snap-engaged with the edge of a corresponding aperture formed in an inner wall of the vehicle body to fix the outlet fitting thereto.

8. A rear-view mirror according to claim 1, wherein the shutter device is of the louvre type with slats connected to a linkage for common movement.

* * * * *

UNITED STATES PATENT AND TRADEMARK OFFICE
CERTIFICATE OF CORRECTION

PATENT NO. : 4,350,084
DATED : September 21, 1982
INVENTOR(S) : Roberto Azzola

It is certified that error appears in the above-identified patent and that said Letters Patent is hereby corrected as shown below:

On the title page Insert

-- (30) Foreign Application Priority Data

January 21, 1980     Italian     52852-B/80 --.

Signed and Sealed this

Nineteenth Day of July 1983

[SEAL]

Attest:

GERALD J. MOSSINGHOFF

Attesting Officer     Commissioner of Patents and Trademarks